United States Patent
Gallucci et al.

(10) Patent No.: US 9,919,967 B2
(45) Date of Patent: Mar. 20, 2018

(54) ACCELERATOR FOR HYDRAULIC BINDING AGENTS WITH LONG PROCESSING TIME AND VERY EARLY STRENGTH

(71) Applicant: SIKA TECHNOLOGY AG, Baar (CH)

(72) Inventors: Emmanuel Gallucci, Zürich (CH); Patrick Juilland, Bern (CH); Arnd Eberhardt, Winterthur (CH); Lukas Frunz, Dietlikon (CH); Christian Bürge, Schafisheim (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/312,298

(22) PCT Filed: May 20, 2015

(86) PCT No.: PCT/EP2015/061152
§ 371 (c)(1),
(2) Date: Nov. 18, 2016

(87) PCT Pub. No.: WO2015/177232
PCT Pub. Date: Nov. 26, 2015

(65) Prior Publication Data
US 2017/0073267 A1   Mar. 16, 2017

(30) Foreign Application Priority Data
May 21, 2014 (EP) .................................. 14169313

(51) Int. Cl.
| | | |
|---|---|---|
| *C04B 24/02* | (2006.01) | |
| *C04B 24/00* | (2006.01) | |
| *C04B 40/00* | (2006.01) | |
| *C04B 24/32* | (2006.01) | |
| *C04B 28/04* | (2006.01) | |
| *C04B 103/10* | (2006.01) | |
| *C04B 103/00* | (2006.01) | |
| *C04B 103/12* | (2006.01) | |
| *C04B 103/14* | (2006.01) | |
| *C04B 103/32* | (2006.01) | |

(52) U.S. Cl.
CPC ............ *C04B 24/02* (2013.01); *C04B 24/003* (2013.01); *C04B 24/32* (2013.01); *C04B 28/04* (2013.01); *C04B 40/0039* (2013.01); *C04B 40/0042* (2013.01); *C04B 2103/0027* (2013.01); *C04B 2103/10* (2013.01); *C04B 2103/12* (2013.01); *C04B 2103/14* (2013.01); *C04B 2103/32* (2013.01)

(58) Field of Classification Search
CPC ..... C04B 24/003; C04B 24/163; C04B 24/18; C04B 24/223; C04B 24/226; C04B 24/02; C04B 24/32; C04B 24/2647; C04B 40/0039; C04B 2/00; C04B 20/008; C04B 22/064; C04B 28/04; C04B 40/0042; C04B 2103/10; C04B 2103/001; C04B 2103/30; C04B 2103/14; C04B 2103/12; C04B 2103/0027; C04B 2103/32
See application file for complete search history.

(56) References Cited

U.S. PATENT DOCUMENTS 3,854,985 A * 12/1974 Suzuki .................... C04B 28/04
                                                                106/666
2011/0067604 A1* 3/2011 Buerge .................. C04B 24/003
                                                                106/810

FOREIGN PATENT DOCUMENTS

| CN | 101817662 A * | 9/2010 |
|---|---|---|
| EP | 0056627 A2 | 7/1982 |
| EP | 0076927 A1 | 4/1983 |
| EP | 1136508 A1 | 9/2001 |
| EP | 1138697 A1 | 10/2001 |
| EP | 1348729 A1 | 10/2003 |
| EP | 2128110 A1 | 12/2009 |
| WO | 9703929 A1 | 2/1997 |
| WO | 9818740 A1 | 5/1998 |
| WO | 2008034616 A1 | 3/2008 |

OTHER PUBLICATIONS

International Preliminary Report on Patentability dated Dec. 1, 2016 corresponding to International Patent Application No. PCT/EP2015/061152, 7 pages.
International Search Report corresponding to PCT/EP2015/061152, dated Aug. 20, 2015, 4 pages.

* cited by examiner

*Primary Examiner* — Anthony J Green
(74) *Attorney, Agent, or Firm* — Dentons US LLP

(57) ABSTRACT

The present invention relates to an accelerator for hydraulic binding agents, comprising at least one phosphoric acid ester of a multivalent alcohol and at least one calcium compound. The accelerator according to the invention is capable of producing a very fast-curing mortar or concrete composition which has a high early strength and, nevertheless, very favorable processing properties and thus allows early dismantling or early loading and does not cause any losses in the final strength.

28 Claims, No Drawings

ACCELERATOR FOR HYDRAULIC BINDING AGENTS WITH LONG PROCESSING TIME AND VERY EARLY STRENGTH

CROSS-REFERENCE TO PRIOR APPLICATIONS

This application is a National Stage of PCT/EP2015/061152, filed May 20, 2015, and designating the United States (published on Nov. 26, 2015, as WO 2015/177232 A1), which claims priority under 35 U.S.C. § 119 to European Patent Application No. 14169313.5, filed May 21, 2014, each hereby expressly incorporated by reference in its entirety and each assigned to the assignee hereof.

TECHNICAL FIELD

The invention relates to admixtures for hydraulic binders and systems produced therefrom such as concrete and mortar. The present invention relates more particularly to an accelerator for hydraulic binders, comprising at least one phosphoric acid ester of a polyhydric alcohol and also at least one calcium compound. The invention further relates to the use of a composition comprising at least one or consisting of at least one accelerator of the invention for accelerating the setting and/or hardening of hydraulic binders and also mortar or concrete produced therefrom, especially of quick-setting cement, and also to a method for accelerating the setting and hardening of hydraulic binders and also mortar or concrete produced therefrom.

PRIOR ART

In the production of precast components made from concrete or from reinforced concrete, or for trafficway or runway renovations, there are many applications which call for high early strength, so that the precast components can be removed from the shuttering, transported, stacked or prestressed after just a few hours, or the trafficways or runways can be travelled or subjected to load. In order to achieve this objective in practice, there is use not only of high-performance concrete formulations, with low w/c ratios or high cement contents, for example, but also, often, of heat or steam treatments. These treatments require a lot of energy and additional equipment, and so increasing energy prices, significant capital costs, and problems with durable adhesion and exposed concrete mean that such treatment is increasingly being shunned, with a search instead for other ways of accelerating the hardening process.

Alternatives to the heat or steam treatment include a variety of additives, but these additives do not always yield satisfactory results. There are indeed many substances known to accelerate the setting and hardening of concrete. In common use, for example, are highly alkaline substances such as alkali metal hydroxides, alkali metal carbonates, alkali metal silicates, alkali metal aluminates, and alkaline earth metal chlorides. These substances, however, reduce in some cases the ultimate strength and the durable adhesion of the concrete.

EP 0076927 B1 and EP 0946451 B1 disclose alkali-free solidification accelerators for hydraulic binders that are said to avoid these disadvantages. For accelerating the solidification and hardening of hydraulic binders such as cement, lime, hydraulic lime, and gypsum, and also mortar and concrete produced from them, an alkali-free solidification and hardening accelerator is added, said accelerator comprising aluminum hydroxide and optionally aluminum salts and organic carboxylic acids.

While such known accelerators do accelerate the setting and hardening of hydraulically setting systems, they are nevertheless expensive, their use is restricted because of poor durable adhesion and inadequate activity, and at the same time they also reduce the working time and have adverse consequences for the ultimate strengths of the concrete. Other disadvantages of such setting and hardening accelerators, moreover, are relatively low early strength within the first hours and days, and the inadequate stability of the solution.

The presently known systems in which the hydration of concrete is accelerated by the addition of a setting accelerator relate mostly to sprayed concrete. A disadvantage of the known techniques for hydration control is that the cement mixtures set very rapidly after the accelerator has been added. Such rapid setting is usually also desirable in the context of sprayed concrete application. Known systems of this kind, however, are not appropriate if the cement mixture must be worked further after activation, or if the worked concrete has to be subjected to load after a short time. With the known systems for sprayed concrete application, however, there is no further workability after activation.

One onward development of such accelerators is taught in EP 2128110 A1. That system uses esters of polyhydric alcohols as admixtures, enabling high early strength but without too great an adverse effect on working time or ultimate strength. Even this development, however, is still inadequate for certain applications, owing to more stringent requirements for short production cycles or concrete moldings, or for ultraquick loadability of substrates.

Depending on application, therefore, there continues to be a requirement to develop an economically attractive admixture which significantly accelerates the setting and hardening process of compositions comprising hydraulic binders, and with which it is possible to produce a fast-curing mortar or concrete composition which exhibits high early strength and yet very favorable working properties, and thus allows early deshuttering or early loading and results in as far as possible no detractions from the ultimate strength.

SUMMARY OF THE INVENTION

It is an object of the present invention, therefore, to provide a setting and/or hardening accelerator, in the form, for example, of an admixture, which on the one hand increases the early strength, by accelerating the reactions in the cement or concrete mixture, but on the other hand does not substantially impair the workability and hence allows the accelerated mixture to be worked further for a certain period of time. In comparison to conventional accelerators, the present invention is to yield better results and/or have fewer disadvantages.

This is achieved in accordance with the invention through the features of the first claim.

Among the advantages of the invention is that a hydraulically setting composition, such as a cement, concrete or mortar mixture, which has been accelerated by the present invention remains workable for a long time in spite of enhanced early strength. In comparison to unactivated concrete, an accelerator of the invention produces drastically increased early strengths, allowing the early deshuttering or loading of the components produced. At the same time, however, the workability of the accelerated mixture is nevertheless retained over a wide time period. Further aspects of the invention are subjects of further independent claims. Particularly preferred embodiments of the invention are subjects of the dependent claims.

CERTAIN EMBODIMENTS OF THE INVENTION

The setting and/or hardening accelerator of the invention for hydraulic binders comprises at least one phosphoric acid ester of a polyhydric alcohol and at least one calcium compound.

The term "polyhydric alcohol" refers to a hydroxy-functional compound having more than one hydroxyl group, having for example two, three, four or five hydroxyl groups. Particularly preferred is an alcohol having three hydroxyl groups, in other words a trihydric alcohol. Examples of suitable alcohols are polyhydric alkyl alcohols such as propanediol, butanediol, glycerol, diglycerol, polyglycerol, trimethylolethane, trimethylolpropane, 1,3,5-pentanetriol, erythritol, pentaerythritol, dipentaneerythritol, sorbitol, sorbitan, glucose, fructose, sorbose or isosorbide. Particularly preferred is glycerol.

The abovementioned ester is obtained by esterification from a polyhydric alcohol with phosphoric acid or one of its salts. The ester is preferably a partial ester of a polyhydric alcohol, preferably of a trihydric alcohol. The term "partial ester of a polyhydric alcohol" means that the polyhydric alcohol, as well as one or more ester bonds, also has one or more free hydroxyl groups. The ester may be a mono-, di- or triester. A monoester is preferred, preferably a monoester of a di- or trihydric alcohol, more preferably of a trihydric alcohol, especially preferably of glycerol.

The phosphoric acid for preparing the ester may be in the form of a free acid or else of a salt or partial salt, the term "salt" here and below referring to the product of a neutralization reaction of the phosphoric acid with a base, and of the phosphates which form after drying. "Partial salt" means that not all of the acid functions of the phosphoric acid have been neutralized.

Any remaining free acid groups of the phosphoric acid ester are preferably wholly or partially neutralized, the salt being a metal salt, alkali metal salt or alkaline earth metal salt, in other words a salt of mono- or polyvalent cations, preferably a sodium, potassium, calcium, magnesium, zinc or aluminum salt, preferably a sodium or aluminum salt. In a basic aqueous medium, the free acid groups may of course also be in deprotonated, anionic form.

The calcium compound is preferably an inorganic and/or organic salt, with anions which are, for example, oxide, hydroxide, sulfate, sulfide, carbonate, hydrogencarbonate, chloride, fluoride, bromide, iodide, carbide, nitrate, nitrite, bromate, iodate, phosphate, phosphite, lactate, acetate, gluconate, stearate, citrate, propionate and/or mixtures thereof and/or hydrates of these salts. Particularly preferred are calcium oxide and calcium hydroxide, and/or the hydrates thereof, especially calcium oxide.

Especially preferred are calcium compounds which as solids, as for example in the form of powders, have a high specific surface area. This means in the present case a preferred specific surface area, measured by the BET method ($N_2$ adsorption, measured according to DIN ISO 9277), of between 1 and 50 $m^2/g$ of calcium compound, preferably between 1.5 and 30 $m^2/g$, more particularly between 1.9 and 10 $m^2/g$ of calcium compound.

Suitable phosphoric acid esters for the setting and/or hardening accelerator of the invention are, for example, glycerol phosphates. Preferred is glycerol monophosphate, particularly preferred is glycerol 2-phosphate or glycerol 3-phosphate, and/or hydrates thereof.

The setting and hardening accelerator of the invention finds application in a variety of sectors, particularly in concrete and cement technology. The accelerator possesses particularly good properties as an accelerator for hydraulically setting compositions, meaning that it can be used to accelerate the setting and/or hardening of hydraulic binders, especially of quick-setting cement, and also of mortar or concrete produced therefrom. The accelerator of the invention can be used, moreover, to produce mortar or concrete having high early strength and ultimate strength. The setting and/or hardening accelerator of the invention is therefore particularly suitable if the hydraulically setting composition must be travelable or loadable again very soon after application, such as in road construction or bridge construction, for example, in the prefabrication of concrete elements, in the context of prefabricated components made of concrete and reinforced concrete, or in the case of runway renovations, particularly flight runways, so that the finished components can be deshuttered, transported, stacked or prestressed after just a few hours, or the trafficways or runways can be traveled after just a few hours.

The setting and hardening accelerator of the invention has been found, surprisingly, to be a particularly quick accelerator, as compared with conventional accelerators. Moreover, the accelerator of the invention has a significantly adverse effect neither on the working time nor on the ultimate strength of the mortar or concrete produced using it. The compressive strength of concrete accelerated in accordance with the invention after a few hours is in fact higher than in all known comparable systems.

Hydraulic binders or compositions which can be used are in principle all hydraulically setting substances known to the person skilled in the art of concrete. In question in particular here are hydraulic binders such as cements, as for example Portland cements or high-alumina cements and their respective mixtures with, for example, flyash, silica fume, slag, foundry sands, and limestone fillers. Further hydraulically setting substances in the sense of the present invention are burnt lime or calcined paper sludge from papermaking residues. A preferred hydraulic binder is cement. Additionally possible are aggregates such as, for example, sand, gravel, stones, finely ground quartz, chalks, and also constituents customary as additives, such as concrete superplasticizers, examples being lignosulfonates, sulfonated naphthalene-formaldehyde condensates, sulfonated melamine-formaldehyde condensates or polycarboxylate ethers, other accelerators, corrosion inhibitors, retarders, shrinkage reducers, defoamers or air entrainers.

The accelerator of the invention may be put to use in accordance with the invention in either liquid or solid form, both alone and as a constituent of an admixture. The invention therefore additionally relates to an admixture in liquid or solid form, comprising at least one accelerator of the invention. Moreover, the two essential constituents of the invention, the phosphoric acid ester of a polyhydric alcohol and the calcium compound, need not be added simultaneously for the technical effect of the invention, but can instead be added in temporally and locationally separate process steps to the mixture that is to be accelerated, or may already be present.

In one advantageous embodiment, the accelerator of the invention is premixed, preferably without hydraulic binder.

In order to improve the workability and to extend the working time following addition of the accelerator of the invention to a hydraulic binder, the admixture preferably comprises a superplasticizer as well as the accelerator. Examples of superplasticizers contemplated include lignosulfonates, sulfonated naphthalene-formaldehyde condensates, sulfonated melamine-formaldehyde condensates, sulfonated vinyl copolymers or polycarboxylate superplasticizers, of the kind known as high-performance plasticizers in concrete chemistry, for example, or mixtures thereof. Preferred in particular are polycarboxylate superplasticizers of the kind described for example in EP 0056627 B1, EP 0840712 B1, EP 1136508 A1, EP 1138697 B1 or EP 1348729 A1. Particularly preferred superplasticizers are those prepared by polymer-analogous reaction, as described for example in EP 1138697 B1 or EP 1348729 A1.

The accelerator, or the admixture comprising the accelerator, may also comprise further constituents. Examples of further constituents are solvents, especially water, or additives, such as further accelerating substances, as for example thiocyanates, nitrates or aluminum salts, acids or their salts, or amine-containing substances such as alkanolamines, retarders, shrinkage reducers, defoamers or foam formers.

If the accelerator of the invention or the admixture comprising the accelerator is used in liquid form, a solvent is preferably employed for the reaction. Examples of preferred solvents are hexane, toluene, xylene, methylcyclohexane, cyclohexane or dioxane, and also alcohols, especially ethanol or isopropanol, and water, with water being the most preferred solvent.

The accelerator of the invention or the admixture comprising the accelerator may also be present in the solid aggregate state, in the form for example of powders, flakes, pellets, granules or plates, and can be readily transported and stored in this form.

The accelerator of the invention may, for example, be present in the solid aggregate state and be mixed with a superplasticizer which is likewise present in the solid aggregate state, and may be stored or transported in this way for a relatively long time. Alternatively, the accelerator of the invention may be mixed with a liquid superplasticizer and used as a liquid admixture. The liquid admixture may also be converted subsequently into the solid aggregate state again, such as into powder form, for example, by means of spray drying, with the aid of protective colloids or other drying aids, for example.

The accelerator of the invention or the admixture comprising the accelerator may, in the solid aggregate state, also be part of a cement composition, referred to as a dry mix, which can be stored for a prolonged period and is typically packaged into sacks or stored in silos and used.

The accelerator of the invention or the admixture comprising the accelerator may also be added to a customary concrete composition together with or shortly before or shortly after the addition of the water. It has emerged as being particularly suitable here for the accelerator of the invention to be added in the form of an aqueous solution or dispersion, more particularly as tempering water or as part of the tempering water or as part of a liquid admixture which is added with the tempering water to the hydraulic binder.

The accelerator of the invention or the admixture may in liquid form also be sprayed onto the binder, the concrete, mortar, and nonhydraulic admixtures before or after the grinding of the hydraulic or latent hydraulic binder. For example, the hydraulic binder may be partially coated with the accelerator or with the admixture comprising the accelerator. This enables the production of a hydraulic binder, more particularly cement or latent hydraulic slag, which already includes the accelerator or the admixture comprising the accelerator, and so can be stored and sold as a ready mix, in the form for example of quick-setting cement. Following addition of the tempering water, this cement exhibits the desired properties of rapid setting and of high early strength, without any need for a further admixture to be added to the tempering water on the building site additionally.

In a further aspect, the present invention relates to a binder-comprising mixture comprising at least one hydraulically setting binder and at least one setting and hardening accelerator of the invention. Examples of binders contemplated include cement, especially Portland cements or high-alumina cements and their respective mixtures with flyash, silica fume, slag, foundry sands, gypsum, and limestone fillers or burnt lime, a latent hydraulic powder or inert microscopic powder. Binder-comprising mixtures contemplated include, preferably, concrete compositions. Furthermore, the mixture may comprise further aggregates such as sand, gravel, stones, finely ground quartz, chalks, and also constituents customary as additives, such as concrete superplasticizers, examples being lignosulfonates, sulfonated naphthalene-formaldehyde condensates, sulfonated melamine formaldehyde condensates or polycarboxylate ethers (PCE), accelerators, corrosion inhibitors, retarders, shrinkage reducers, defoamers or foam formers.

The binder-comprising mixture preferably comprises at least one superplasticizer, preferably a polycarboxylate ether (PCE)-based superplasticizer, in addition to the accelerator.

The accelerator of the invention is used preferably in an amount of 0.001 to 2 wt % of phosphoric acid ester, based on the weight of the binder, and also 0.001 to 10 wt % of calcium, based on the weight of the binder, in order to achieve the desired effect. It is also possible for a plurality of accelerators to be used in mixed form in order to achieve the desired effect.

In one preferred embodiment, the calcium compound is used as a solid. In this case it is advantageous, as described earlier on above, to use a solid having high specific surface area. A high specific surface area leads to an improvement in the accelerator effect. In order to obtain the same acceleration effect it is possible, as compared with a calcium compound of low specific surface area, to use proportionally less of a calcium compound with a high specific surface area. For the present invention it is therefore preferred for the calcium compound to be metered in such a manner as to bring about a ratio between the total surface area of the calcium compound and the amount of hydraulic binder of approximately 50 to 70 $m^2$/kg of binder, preferably approximately 55 to 65 $m^2$/kg of binder, more preferably approximately 57 to 63 $m^2$/kg of binder. The total surface area of the calcium compound here denotes the mathematical product of the specific surface area (in $m^2$/g; by BET ($N_2$ adsorption, measured according to DIN ISO 9277)) and the quantity employed (in grams per kg of hydraulic binder).

The amount of the phosphoric acid ester relative to the amount of the calcium compound is in this embodiment adapted preferably such that 0.001 to 0.05, more preferably 0.005 to 0.04, very preferably 0.008 to 0.02 g of phosphoric acid ester is used per $m^2$ of calcium compound.

In a further aspect, the present invention relates to a method for producing a binder-comprising mixture, in which the at least one accelerator of the invention is added separately or as a premixed admixture in solid or liquid form to the binder.

In a further aspect, the present invention relates to a method for accelerating the setting and hardening of hydraulic binders and also mortar or concrete produced therefrom, in which a setting and hardening accelerator of the invention is added in an amount of phosphoric acid ester of 0.001 to 10 wt %, preferably 0.01 to 1 wt %, especially preferably 0.01 to 0.1 wt %, based on the weight of the cement, and also in an amount of calcium of 0.001 to 10 wt %, preferably 0.01 to 1 wt %, especially preferably 0.01 to 0.1 wt %, based on the weight of the cement, to a mixture which comprises hydraulic binders. If an admixture comprising the accelerator of the invention and preferably additionally at least one superplasticizer is added to a hydraulic binder, the amount of the overall admixture added is 0.01 to 10 wt %, preferably 0.1 to 10 wt %, more preferably 1 to 5 wt %, based on the weight of the hydraulic binder.

With the present invention, an admixture for hydraulic binders is provided that accelerates the setting and hardening process of the hydraulic binders without adverse effects on the working times, the development of strength or the durable adhesion of the mortar or concrete compositions produced therewith. The admixture of the invention, and especially the setting and hardening accelerator of the invention, are therefore particularly suitable when the hydraulically setting composition is required to be loadable or travelable again very quickly after application, as for example in road building or bridge building, in the prefabrication of concrete elements in the context of prefabricated components made of concrete and of reinforced concrete, or in the case of runway renovations, especially of flight runways. As a result, the finished components can be deshuttered, transported, stacked or prestressed, or the trafficways or runways traveled, after just a few hours.

The setting and hardening accelerator of the invention has proven surprisingly to be a particularly rapid accelerator, as compared with conventional accelerators. Moreover, the accelerator of the invention has an adverse effect neither on the working time nor on the ultimate strength of the mortar or concrete produced using it. The early strength after a few hours has proven to be significantly higher than with all comparable systems.

EXAMPLES

All percentage figures refer, unless otherwise indicated, to weight percent (wt %) based on the weight of the overall composition.
1. Liquid Admixtures
1.1. Production of the Admixtures
Admixture Z1

5.0 g of a glycerol 2-monophosphate (glycerol phosphate disodium salt pentahydrate, available for example from Sigma Aldrich Schweiz) were dissolved in 160.0 g of a liquid polycarboxylate ether superplasticizer (Sika® Viscocrete® 20 HE, available from Sika Schweiz AG). Between 1 and 1.6 wt % of this solution, based on the cement, were added together with the tempering water to the mortar mixture.
Admixture Z2

As a reference without accelerator of the invention, the polycarboxylate ether superplasticizer (Sika® Viscocrete® 20 HE, available from Sika Schweiz AG) used for Z1 was used as the admixture. Between 1 and 1.6 wt % of this admixture, based on the cement, were added together with the tempering water to the mortar mixture.
Admixture Z3

As a further reference without accelerator of the invention, another polycarboxylate ether superplasticizer (Glenium® ACE30, available from BASF Admixtures Deutschland GmbH) was used as the admixture. Between 1 and 1.6 wt % of this admixture, based on the cement, were added together with the tempering water to the mortar mixture.

1.2. Production of the Example Mortar Mixtures with Liquid Admixtures

Cement used for mortar mixtures MM1 and MM2 was a quick-setting Portland cement CEM I 52.5R.

The sands (maximum grain size 8 mm), the cement, and, in the case of MM2, also 3 wt % (based on the weight of the cement used) of calcium oxide (Nekafin® 2 from Kalkfabrik Netstal AG, Switzerland, having a specific surface area (BET) of 1.9 m$^2$/g) used were dry-mixed in a Hobart mixer for 1 minute. The tempering water, with the respective admixture dissolved therein, was added over the course of 30 seconds, followed by further mixing for 2.5 minutes more. The total wet mixing time was 3 minutes. The proportionally adjusted water/cement ratio (w/c ratio) of the mortar was 0.4 in all the mixtures.

1.3. Mortar Tests with Liquid Admixtures

To illustrate the activity of the accelerator or admixture of the invention, admixtures Z1, Z2, and Z3 were added to mortar mixtures MM1 and MM2 (see tables 1 and 2). Example B1 with admixture Z1 represents an inventive example, whereas examples V2 to V6 represent comparative examples. For determining the activity of the accelerator or admixture of the invention, determinations were made of the extent of spread (EOS) (table 1) and of the compressive strength (table 2).

TABLE 1

Extent of spread (EOS) in mm after 0, 20, 40, and 60 minutes (min).

| No. | Admixture (wt %) | Mortar mixture | EOS after 0 min | EOS after 20 min | EOS after 40 min | EOS after 60 min |
|---|---|---|---|---|---|---|
| B1 | Z1 (1.38 wt % based on cement) | MM2 (with 3 wt % of CaO based on cement) | 215 | 205 | 151 | 111 |
| V2 | Z2 (1.09 wt % based on cement) | MM2 (with 3 wt % CaO based on cement) | 211 | 197 | 136 | 111 |
| V3 | Z3 (1.10 wt % based on cement) | MM2 (with 3 wt % CaO based on cement) | 197 | 187 | 153 | 131 |
| V4 | Z1 (1.60 wt % based on cement) | MM1 | 250 | 247 | 251 | 213 |
| V5 | Z2 (1.60 wt % based on cement) | MM1 | 263 | 245 | 237 | 231 |
| V6 | Z3 (1.60 wt % based on cement) | MM1 | 257 | 235 | 213 | 210 |

The extent of spread (EOS) of the mortar was determined according to EN 1015-3.

The values set out in table 1 show that the workability of the mortar to which the accelerator of the invention has been added is largely retained, in comparison to unaccelerated or differently accelerated compositions. For the rapid production of prefabricated components, and also for road or runway construction, the EOS values after 20 min in particular are important. An EOS value of more than 200 mm after 20 min is evidence of very good workability during the time usually required for quick-setting concrete applications. For use in road or bridge building or for the production of prefabricated concrete elements which must be deshuttered, transported, stacked or prestressed after just a few hours, or for runway renovations, however, high early strength values (for example, compressive strengths after 4 or 6 hours) are still much more important than the extent of spread.

Table 2 shows compressive strength values (in N/mm$^2$) of the inventively accelerated mortar composition B1, and also of comparative example compositions V2 to V6 after 4 hours and 6 hours, measured using a needle penetrometer (Mecmesin BFG500 on prisms (40×40×160 mm) according to standard EN 196-1.

TABLE 2

Compressive strength in N/mm$^2$ after 4 and 6 hours (h).

| No. | Admixture (wt %) | Mortar mixture | After 4 h | After 6 h |
|---|---|---|---|---|
| B1 | Z1 (1.38 wt %) | MM2 (3 wt % CaO) | 9.8 | 30.6 |
| V2 | Z2 (1.09 wt %) | MM2 (3 wt % CaO) | 3.4 | 15.4 |
| V3 | Z3 (1.10 wt %) | MM2 (3 wt % CaO) | 3.5 | 16.9 |
| V4 | Z1 (1.60 wt %) | MM1 | 3.2 | 16.8 |
| V5 | Z2 (1.60 wt %) | MM1 | 1.9 | 6.4 |
| V6 | Z3 (1.60 wt %) | MM1 | 2.3 | 9.9 |

Table 2 shows clearly the effect of the inventive accelerator in example B1. When the inventive accelerator is used, in comparison with conventional accelerators (V2, V3 or V4), virtually a doubling after 6 h, and after 4 h almost a tripling, of the strength values are found. The difference relative to the unaccelerated compositions (V5 and V6), as expected, is even greater. It is further apparent that the effect of the inventive accelerator, comprising a phosphoric acid ester of a polyhydric alcohol and a calcium compound, does not merely represent a linear combination of the effects of the individual components which already have accelerating activity, namely phosphoric acid ester (V4) or a calcium compound (V2 and V3). After 4 h, in particular, the compressive strength of the inventively accelerated composition (B1) is significantly higher than that of the individually accelerated compositions, even in spite of the fact that the concentration of phosphoric acid ester in B1 is lower than in V4. A significant, surprising synergistic effect is therefore observable.

2. Individually Added Admixtures
2.1. Substances Used

A conventional Portland cement CEM I 52.5R was used in all of example mortar mixtures MM3, MM4, MM5, MM11, MM12, MM13, and MM14. For the mixtures MM6 to MM9, a cement/flyash mixture CEM IV/B (50 wt % Portland cement CEM I 42.5R+50 wt % silica-rich flyash) was used. The aggregate employed in all of the example mortar mixtures MM3-MM5 was a conventionally sand (maximum grain size 8 mm). In the case of mixtures MM6 to MM14, a finer sand is used, with maximum grain size 2 mm. The superplasticizer used in all of examples MM3-MM14 was a polycarboxylate ether (PCE)-based product (Sika® Viscocrete® 20 HE, available from Sika Schweiz AG). Mortar mixtures MM3, MM4, MM7, MM8, MM9, MM11, MM12, MM13, and MM14 additionally contain calcium oxide (CaO), available under the trade name Nekafin® 2 from Kalkfabrik Netstal AG, Switzerland). Mortar mixtures MM3, MM8, MM9, MM11, MM12, MM13, and MM14 additionally contained glycerol 2-monophosphate (glycerol phosphate disodium salt (GPD) pentahydrate, available for example from Sigma Aldrich Schweiz). The proportions of the GPD, CaO, and PCE additives in weight percent, based on the weight of the hydraulic binder used in the respective mixture MM3-MM9, are listed in table 3.

TABLE 3

Example mortar mixtures containing GPD (glycerol 2-monophosphate disodiunn salt pentahydrate), CaO (calcium oxide) and PCE (polycarboxylate ether superplasticizer). The percentages denote weight percent based on the weight of the hydraulic binder used.

| No. | Mortar mixture | GPD (%) | CaO (%) | PCE (%) |
|---|---|---|---|---|
| B7 | MM3 (inventive) | 0.15 | 3 | 0.9 |
| V8 | MM4 (reference) | — | 3 | 0.6 |
| V9 | MM5 (reference) | — | — | 0.5 |
| V10 | MM6 (reference) | — | — | 0.6 |
| V11 | MM7 (reference) | — | 3 | 0.6 |
| B12 | MM8 (inventive) | 0.04 | 3 | 0.6 |
| B13 | MM9 (inventive) | 0.075 | 3 | 0.6 |
| B14 | MM11 (inventive) | 0.05 | 3 | 0.5 |
| B15 | MM12 (inventive) | 0.1 | 3 | 0.5 |
| B16 | MM13 (inventive) | 0.15 | 3 | 0.5 |
| B17 | MM14 (inventive) | 0.2 | 3 | 0.5 |

2.2. Production of the Example Mortar Mixtures

Hydraulic binder, sand, and (in the case of MM3, MM4, MM7, MM8, MM9, MM11, MM12, MM13, and MM14) calcium oxide, and also (in the case of MM3, MM8, MM9, MM11, MM12, MM13, and MM14) GPD, were dry-mixed in a Hobart mixer for 30 seconds. Over the course of 30 seconds, the tempering water and the superplasticizer were added, and mixing was continued for 3.5 minutes more. The total wet mixing time was 4 minutes. The proportionally adjusted water/cement ratio (w/c ratio) of the mortar was 0.45 in all of mixtures MM3 to MM9, and the w/c ratio was 0.5 in mixtures MM11 to MM14.

2.3. Mortar Tests

For determining the activity of the accelerator or admixture of the invention, determinations were made of the extent of spread (EOS) and of the compressive strength (tables 4 and 5). The extent of spread (EOS) of the mortar was determined according to EN 1015-3. The compressive strength was measured using a needle penetrometer (Mecmesin BFG500 on prisms (40×40×160 mm) according to standard EN 196-1.

TABLE 4

Extent of spread (EOS) in mm after 0 and 30 minutes (min) and compressive strengths in N/mm$^2$ after 4, 6, 8 and 24 hours (h) for example mixtures MM3-MM5.

| | | Extent of spread (mm) | | Compressive strength (N/mm$^2$) | | | |
|---|---|---|---|---|---|---|---|
| No. | Mortar mixture | after 0 min | after 30 min | after 4 h | after 6 h | after 8 h | after 24 h |
| B7 | MM3 (inventive) | 480 | 480 | 1.6 | 3.6 | 11.0 | 49.5 |
| V8 | MM4 (reference) | 500 | 600 | 1.0 | 1.9 | 6.0 | 46.6 |
| V9 | MM5 (reference) | 480 | 520 | 0.6 | 1.1 | 3.6 | 41.2 |

The inventive accelerator mixed in the form of individual components also exhibits, in example B7, a much quicker development of compressive strength than the noninventive, comparative examples V8 and V9.

Table 5 shows that the strength values of the inventively accelerated mortar mixtures MM8 (example B12) and MM9 (example B13) after 48 hours are at least as high as those of the noninventive mixtures MM6 (example V10) and M7 (example V11).

TABLE 5

Compressive strengths in N/mm² after 20, 24 and 48 hours (h) for example mixtures MM6-MM9.

| No. | Mortar mixture | Compressive strength (N/mm²) | | |
|---|---|---|---|---|
| | | after 20 h | after 24 h | after 48 h |
| V10 | MM6 (reference) | 1.1 | 3.1 | 17.2 |
| V11 | MM7 (reference) | 3.0 | 6.4 | 16.9 |
| B12 | MM8 (inventive) | 4.9 | 8.8 | 17.6 |
| B13 | MM9 (inventive) | 9.5 | 11.4 | 20.4 |

Produced additionally was a further mortar mixture MM10, which differs from MM9 only in that, instead of 3 wt % of CaO having a specific surface area of 1.9 m²/g, just 1 wt % of CaO having a specific surface area of 6 m²/g was used. The values for extent of spread and compressive strength of MM10 were substantially identical to MM9. This shows the effect of the specific surface area of the calcium compound on the activity of the inventive accelerator.

Also measured were the compressive strengths of mortar mixtures MM11 to MM14 after 4 h, 6 h, and 8 h. The results are set out in table 6.

TABLE 6

Compressive strengths in N/mm² after 4, 6 and 8 hours (h) for example mixtures MM11-MM14.

| No. | Mortar mixture | Compressive strength (N/mm²) | | |
|---|---|---|---|---|
| | | after 4 h | after 6 h | after 8 h |
| B14 | MM11 (inventive) | 0.8 | 3.0 | 7.6 |
| B15 | MM12 (inventive) | 0.9 | 3.9 | 9.1 |
| B16 | MM13 (inventive) | 2.1 | 7.5 | 13.6 |
| B17 | MM14 (inventive) | 1.9 | 6.8 | 12.9 |

The inventive examples B14 to B17 show clearly that there is an optimum range for the synergy effect of the inventive accelerator. As the proportion of GPD goes up, with a constant proportion of CaO, there is an increase in the compressive strength of the mortar mixture. After an optimum value, however, in this case 0.15 wt % of GPD (MM13), the compressive strength falls again, surprisingly (MM14).

These examples show the outstanding effect of the accelerator of the invention, which in particular after very short times allows much higher early strengths than conventional accelerators, without bringing with it substantial disadvantages in workability, ultimate strength or other properties.

As a result of the use of the inventive accelerator in mortar or concrete compositions, it is possible to implement even higher cycle times, earlier load-bearing capacity or more rapid repair works than with conventionally accelerated compositions comprising hydraulic binders.

The working examples described above serve merely to demonstrate the effects and do not confine the invention to the applications shown. The inventive accelerator and an admixture comprising the inventive accelerator, in solid or liquid form, can be used in any compositions which comprise hydraulically setting binders.

The invention claimed is:

1. An accelerator for hydraulic binders, comprising at least one phosphoric acid ester of a polyhydric alcohol and at least one calcium compound, wherein the at least one calcium compound is a solid having a specific surface area, measured by the BET method, of between 1 and 50 m²/g, and wherein the phosphoric acid ester and the calcium compound are different compounds.

2. The accelerator as claimed in claim 1, wherein the at least one calcium compound is an inorganic or organic calcium salt or a mixture of inorganic and/or organic calcium salts.

3. The accelerator as claimed in claim 2, wherein the amount of the phosphoric acid ester relative to the total surface area of the at least one calcium compound is 0.001 to 0.05 g of the phosphoric acid ester per m² of the at least one calcium compound.

4. The accelerator as claimed in claim 1, wherein free acid groups of the phosphoric acid ester are deprotonated or wholly or partly neutralized to form a salt, the salt being an alkali metal salt or a salt of polyvalent cations.

5. The accelerator as claimed in claim 1, wherein the phosphoric acid ester is a partial ester of a polyhydric alcohol.

6. The accelerator as claimed in claim 1, wherein the phosphoric acid ester is glycerol phosphate or disodium glycerol phosphate or a hydrate thereof.

7. The accelerator as claimed in claim 1, wherein the specific surface area is between 1.5 and 30 m²/g.

8. The accelerator as claimed in claim 7, wherein the specific surface area is between 1.9 and 10 m²/g.

9. The accelerator as claimed in claim 1, wherein the at least one calcium compound is calcium oxide and/or calcium hydroxide.

10. The accelerator as claimed in claim 3, wherein the amount of the phosphoric acid ester relative to the total surface area of the at least one calcium compound is 0.005 to 0.04 g of phosphoric acid ester per m² of calcium compound.

11. The accelerator as claimed in claim 10, wherein the amount of the phosphoric acid ester relative to the total surface area of the at least one calcium compound is 0.008 to 0.02 g of phosphoric acid ester per m² of calcium compound.

12. The accelerator as claimed in claim 4, wherein the salt is a sodium, calcium or aluminum salt.

13. The accelerator as claimed in claim 5, wherein the polyhydric alcohol is a monoester of a di- or trihydric alcohol.

14. The accelerator as claimed in claim 13, wherein the polyhydric alcohol, is glycerol.

15. An admixture for hydraulically setting systems, comprising at least one accelerator as claimed in claim 1 and at least one superplasticizer.

16. The admixture as claimed in claim 15, wherein the superplasticizer is selected from the group consisting of lignosulfonates, sulfonated naphthalene-formaldehyde condensates, sulfonated melamine-formaldehyde condensates, sulfonated vinyl copolymers, polycarboxylate ethers and mixtures thereof.

17. A mixture comprising a hydraulic binder, wherein the mixture comprises at least one hydraulically setting binder and at least one accelerator as claimed in claim 1.

18. The mixture comprising hydraulic binder as claimed in claim 17, the mixture comprising the phosphoric acid ester in an amount of 0.001 to 2 wt % based on the amount of the binder, and comprising the at least one calcium compound in an amount of 0.001 to 10 wt % based on the weight of the binder.

19. The mixture comprising hydraulic binder as claimed in claim 17, wherein the total BET surface area of the at least one calcium compound per kilogram of hydraulic binder is 50 to 70 m² per kg of binder.

20. The mixture comprising hydraulic binder as claimed in claim 18, wherein the phosphoric acid ester is present in an amount of 0.01 to 1 wt % based on the amount of the binder, and the at least one calcium compound is present in an amount of 0.1 to 5 wt % based on the weight of the binder.

21. The mixture comprising hydraulic binder as claimed in claim 20, wherein the phosphoric acid ester is present in an amount of 0.02 to 0.6 wt % based on the amount of the binder, and the at least one calcium compound is present in an amount of 0.5 to 3 wt % of calcium based on the weight of the binder.

22. The mixture comprising hydraulic binder as claimed in claim 19, wherein the total BET surface area of the at least one calcium compound per kilogram of hydraulic binder is 55 to 65 $m^2$ per kg of binder.

23. The mixture comprising hydraulic binder as claimed in claim 22, wherein the total BET surface area of the at least one calcium compound per kilogram of hydraulic binder is 57 to 63 $m^2$ per kg of binder.

24. A method for producing a mixture comprising a hydraulic binder, wherein the method comprises a step of adding the accelerator as claimed in claim 1 to a hydraulic binder, wherein the phosphoric acid ester and the at least one calcium compound are added together and/or separately from one another.

25. A method for accelerating the setting and/or hardening of hydraulic binders, mortar or concrete produced therefrom, wherein the method comprises a step of adding the accelerator as claimed in claim 1 to a mixture comprising hydraulic binders.

26. The method as claimed in claim 25, wherein the phosphoric acid ester is added in an amount of 0.001 to 2 wt % based on the amount of the hydraulic binder, and the calcium compound is added in an amount of 0.001 to 10 wt % based on the weight of the hydraulic binder.

27. The method as claimed in claim 26, wherein the phosphoric acid ester is added in an amount of 0.01 to 1 wt % based on the amount of the hydraulic binder, and the at least one calcium compound is added in an amount of 0.1 to 5 wt % based on the weight of the hydraulic binder.

28. The method as claimed in claim 27, wherein the phosphoric acid ester is added in an amount of 0.02 to 0.6 wt % based on the amount of the hydraulic binder, and the at least one calcium compound is added in an amount of 0.5 to 3 wt % of calcium based on the weight of the hydraulic binder.

* * * * *